United States Patent [19]

Miyashita

[11] Patent Number: 5,627,813
[45] Date of Patent: May 6, 1997

[54] OPTICAL INFORMATION RECORDING AND/OR REPRODUCING APPARATUS AND METHOD WITH AUTO POWER CONTROL FUNCTION FOR TWO LIGHT SOURCES

[75] Inventor: Akira Miyashita, Tokorozawa, Japan

[73] Assignee: Canon Kabushiki Kaisha, Tokyo, Japan

[21] Appl. No.: 557,912

[22] Filed: Nov. 14, 1995

[30] Foreign Application Priority Data

Nov. 16, 1994 [JP] Japan .................................... 6-281926

[51] Int. Cl.$^6$ ........................................................ G11B 7/00
[52] U.S. Cl. .................... 369/116; 369/44.25; 369/44.38
[58] Field of Search ............................. 369/116, 54, 59, 369/120, 44.25, 44.37, 44.38; 250/208.2

[56] References Cited

U.S. PATENT DOCUMENTS

| | | | |
|---|---|---|---|
| 4,811,348 | 3/1989 | Arimoto et al. | 372/29 |
| 5,191,204 | 3/1993 | Dickson et al. | 250/208.2 |
| 5,297,128 | 3/1994 | Yamaguchi et al. | 369/116 |
| 5,408,453 | 4/1995 | Holtslag et al. | 369/44.38 |
| 5,493,554 | 2/1996 | Sasaki et al. | 369/44.38 |

FOREIGN PATENT DOCUMENTS

| | | |
|---|---|---|
| 3-203821 | 9/1991 | Japan . |
| 4-159623 | 6/1992 | Japan . |

OTHER PUBLICATIONS

Patent Abstracts of Japan for publication No. 1-091343, vol. 13, No. 324, Jul. 1989.
Patent Abstracts of Japan for publication No. 1-013242, vol. 13, No. 185, May 1989.

Primary Examiner—Loha Ben
Attorney, Agent, or Firm—Fitzpatrick, Cella, Harper & Scinto

[57] ABSTRACT

An optical information recording and/or reproducing apparatus radiates a leading light beam from a first light source and a trailing light beam from a second light source to follow the leading beam onto an information track in a recording medium and to perform recording of information with the leading beam and verification with the trailing beam. The apparatus includes a common photosensor for detecting parts of light quantities of the light beams from the first and second light sources, a device for intermittently turning off the light beam not used for reproduction of preformat portions out of the leading beam and trailing beam, with respect to the preformat portions, and a light output controller for controlling the leading beam from the first light source and the trailing beam from the second light source at respective predetermined light outputs, based on the light quantities detected by the photosensor and reference values preliminarily set, when one of the leading beam and trailing beam is off and when both of the leading beam and trailing beam are on.

11 Claims, 8 Drawing Sheets

FIG. 1

FIG. 2A RF1
FIG. 2B RF2
FIG. 2C S1
FIG. 2D S2
FIG. 2E S3
FIG. 2F S4
FIG. 2G S5
FIG. 2H S6
FIG. 2I Vmon

FIG. 6A  S1
FIG. 6B  S1'
FIG. 6C  S_SW
FIG. 6D  Sin

OPTICAL INFORMATION RECORDING AND/OR REPRODUCING APPARATUS AND METHOD WITH AUTO POWER CONTROL FUNCTION FOR TWO LIGHT SOURCES

BACKGROUND OF THE INVENTION

1. Field of the Invention

The present invention relates to an optical information recording and/or reproducing apparatus and method for performing recording of information and verification approximately at the same time as recording, using two light sources, and more particularly to control of light outputs from the two light sources (APC; Auto Power Control).

2. Related Background Art

Conventionally applied in order to increase the speed of sequential information recording operations is a so-called direct verification, in which a verifying laser beam follows up just after a recording laser beam and recording information is immediately reproduced from reflected light of the verifying laser beam whereby verification is carried out approximately at the same time as recording. One of the methods for producing such a recording laser beam and a verifying laser beam is a method for splitting a laser beam from a laser diode into a recording laser beam and a verifying laser beam by a grating. With this method, it is, however, very difficult to separately control the powers of the two laser beams and, because of low optical efficiency, the laser output is insufficient for satisfactory recording. Thus, not only for the optical modulation recording method, but also for the magnetic modulation recording method, a generally employed method is a double laser diode method in which separate laser diodes are provided for recording and for verification to obtain a recording laser beam and verifying laser beam.

Incidentally, direct verification with the double laser diode method requires a laser power automatic control method (hereinafter referred to as APC) for controlling powers (light outputs) of the respective laser diodes. An example of such APC is an extension of the conventional single laser APC technique, which is a method for using two photosensors for individually receiving parts of light emitted from the respective laser diodes and effecting APC separately on the respective laser diodes, using outputs from the two photosensors. Another known method is arranged to allow mutual optical crosstalk between the photosensors, to perform calculation for canceling the crosstalk, using outputs from the respective photosensors, so as to obtain signals corresponding to the laser powers emitted from the respective laser diodes, and to effect APC based thereon.

Further proposed as a method for simplifying the optical construction is a method for using one photosensor in time division, which is a method for alternately lighting the lasers at a timing of an absence of information, sampling signals corresponding to the respective laser powers, and then effecting APC based thereon. Further proposed in order to improve the accuracy of this method are a method for continuously obtaining signals corresponding to the individual laser powers to effect APC based thereon in the bulletin of Japanese Laid-open Patent Application No. 3-203821 and a method for performing sampling in a state close to actual operation to effect APC based thereon in the bulletin of Japanese Laid-open Patent Application No. 4-159623.

However, the method using one photosensor in time division can simplify the optical construction as compared with the cases using two independent photosensors, but, because the signals corresponding to the respective laser powers (hereinafter referred to as laser power monitor signals) must be obtained within a short time in the region of an absence of information, a high-speed arrangement is required for a laser power monitor system consisting of the photosensor and an amplifier. For example, supposing while reproduction of a preformat portion and recording of information are performed with a leading laser beam, direct verification is performed with a trailing laser beam, a duration in which a laser power monitor signal of the trailing beam can be obtained after turning the leading beam off is limited to only a time period of a few micro seconds, for example, a test period provided in the preformat portion or a gap portion present before or after a data region. Thus, the high-speed arrangement is necessary for the laser power monitor system order to obtain a laser power monitor signal within this short time. The high-speed arrangement of the laser power monitor system, however, had the following two problems. One of them is that the system became susceptible to pulsed noise to increase malfunctions and control errors, and the other problem is that higher mounting accuracy became required because of a necessity to decrease a light-receiving area of the photosensor in order to realize the high-speed arrangement.

SUMMARY OF THE INVENTION

The present invention has been accomplished taking into account the above problems in the conventional technology, and an object of the invention is to provide an optical information recording and/or reproducing apparatus arranged to detect quantities of light from two light sources by a common photosensor, which does not require a high-speed arrangement for the power monitor system, but which can realize satisfactory APC operation even in a low-speed arrangement for the power monitor system.

The above object is achieved by an optical information recording and/or reproducing apparatus, which is arranged to radiate a leading light beam from a first light source and a trailing light beam from a second light source to follow the leading beam onto an information track in a recording medium and to perform recording of information with the leading beam and verification with the trailing beam, comprising:

a common photosensor for detecting parts of light quantities of the light beams from the first and second light sources;

means for intermittently turning off the light beam not used for reproduction of a preformat portion out of the leading beam and trailing beam, with respect to the preformat portions; and light output controlling means for controlling the leading beam from the first light source and the trailing beam from the second light source at respective predetermined light outputs, based on quantities of light received by the photosensor and reference values preliminarily set, when one of the leading beam and trailing beam is off and when both of the leading beam and trailing beam are on.

Further, the above object is also achieved by an optical information recording and/or reproducing method, which is arranged to radiate a leading light beam from a first light source and a trailing light beam from a second light source to follow the leading beam onto an information track in a recording medium and to perform recording of information with the leading beam and verification with the trailing beam, comprising:

a step of detecting, in common, parts of light quantities of the light beams from the first and second light sources;

a step of intermittently turning off the light beam not used for reproduction of preformat portions out of the leading beam and trailing beam, with respect to the preformat portions; and a step of controlling the leading beam from the first light source and the trailing beam from the second light source at respective predetermined light outputs, based on the light quantities detected and reference values preliminarily set, when one of the leading beam and trailing beam is off and when both of the leading beam and trailing beam are on.

The details will be explained with embodiments to follow.

DETAILED DESCRIPTION OF THE PREFERRED EMBODIMENTS

Figure 1:
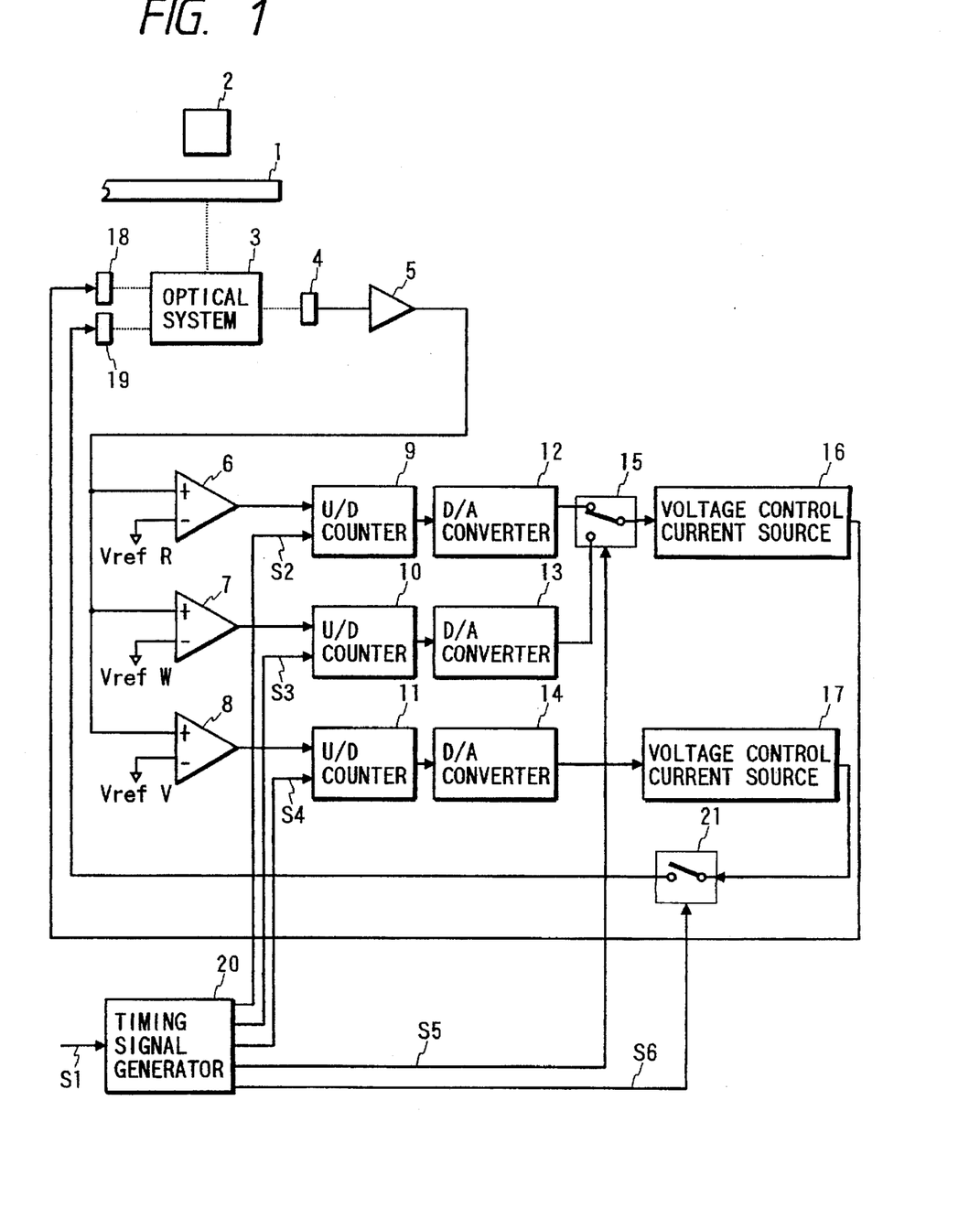
FIG. 1 is a structural drawing to show the first embodiment of the optical information recording and/or reproducing apparatus according to the present invention.

The embodiments of the present invention will be explained in detail by reference to the drawings. FIG. 1 is a structural drawing to show the first embodiment of the optical information recording and/or reproducing apparatus of the present invention. In FIG. 1, reference numeral 1 designates a magneto-optical disk as an information recording medium, which rotates at predetermined velocity by drive o a spindle motor not shown. The magneto-optical disk 1 is provided with a plurality of information tracks, and these information tracks are arranged in a sector structure in which the tracks are divided in a plurality of sectors. A preformat portion in which ID information is recorded is provided at the head of each sector.

Numeral 2 denotes a magnetic head for generating a modulated, magnetic field, which receives a current modulated according to recording data from a drive circuit, not shown, upon recording and then generates the magnetic field modulated according to the information signal. Numeral 3 stands for an optical system for making laser beams emitted from two laser diodes 18, 19 focused on and following on an arbitrary track in the magneto-optical disk 1, guiding reflected light of the beams onto photosensors for signal processing, not shown, and further guiding parts of the laser beams emitted from the two laser diodes 18, 19 to a photosensor 4. The photosensor 4 is a common light sensor for detecting the parts of the light beams from the laser diodes 18, 19. The optical system 3 is composed of a collimator lens, a beam shaping element, a beam splitter, an objective lens, etc., not shown, which are common to the two laser beams.

The present embodiment is provided with a servo system for performing$_o$ servo control, though not shown in FIG. 1. The objective lens in the optical system 3 is mechanically driven based on servo error signals obtained from outputs from the photosensors for signal processing, whereby focusing control and tracking control are performed so as to keep the laser beams from the two laser diodes 18, 19 stably focused on and following on the track regardless of eccentricity or dynamic axial runout of the magneto-optical disk 1.

Further, the present embodiment employs the double laser diode method as a method for direct verification, and numerals 18, 19 denote the laser diodes provided as light sources for recording, reproduction, servo, and verification. Hereinafter, the laser diode 18 will be called a first laser diode and the laser diode 19 a second laser diode. These first and second laser diodes 18, 19 are constructed physically on the same chip of a semiconductor substrate so that a distance between radiative points thereof can be about 100 µm. Laser light emitted from the first laser diode 18 (hereinafter referred to as a leading beam) is used for recording of information, for reproduction of a preformat portion, and for detection of servo error in the servo system. Laser light emitted from the second laser diode 19 (hereinafter referred to as a trailing beam) is used for generation of a reproduction signal for direct verification performed approximately at the same time as recording. Normal reproduction of information may use either the leading 10 beam or the trailing beam.

Here, the optical system 3 is constructed at high accuracy in such a manner that when the servo system operates so that the leading beam traces an arbitrary track well, the trailing beam also follows the leading beam well at the same time. The distance between the two beam spots on the magneto-optical disk 1 can be set in a relatively wide range, depending upon focal lengths of respective lenses constructing the optical system 3, a shaping ratio of the beam shaping element, and the distance between the radiative points of laser diodes 18, 19, and in the present embodiment, the distance between the two beam spots on the magneto-optical disk 1 is set to be about 15 µm, which is fully shorter than the length of the preformat portion. Numeral 5 represents a preamplifier for amplifying an output from the photosensor 4 while effecting current-voltage conversion. A conversion resistance of the preamplifier 5 is adjusted so that laser power on the disk and an output voltage therefrom are in a predetermined proportional relation.

The photosensor 4 and preamplifier 5 compose a laser power monitor system, a response speed of which is determined so as to permit accurate detection of laser power within a time (some ten micro seconds) necessary for the laser beam's tracing a preformat portion. Namely, the response speed of the laser power monitor system is very low. Numerals 6, 7, 8 are comparators for comparing a laser power monitor signal output from the preamplifier 5 with respective, predetermined reference voltages. A reference voltage $V_{ref}R$ of the comparator 6 is set to be equal to a laser power monitor signal corresponding to a power for reproducing the preformat portion (1.5 mW). A reference voltage $V_{ref}W$ Of the comparator 7 is set to be equal to a laser power monitor signal corresponding to a sum of recording power and power for direct verification (10+1.5 mW), and a reference voltage $V_{ref}V$ of the comparator 8 is set to be equal to a laser power monitor signal corresponding to a sum of the power for reproducing the preformat portion and the power for direct verification (1.5+1.5 mW).

Numerals 9, 10, 11 denote up-down counters (U/D counters), which count respective counter values up or down, based on signals from the comparators 6, 7, 8 and enable signals S2, S3, S4 from a timing signal generator 20. Numerals 12, 13, 14 are D/A converters for converting counter values of the respective U/D counters 9, 10, 11 into analog voltages, numeral 15 is a changeover switch for selecting either one of outputs of the D/A converters 12, 13 depending upon a power changeover signal S5, numeral 16 is a voltage-controlled current source for generating a current according to an output voltage from the D/A converter 12 or 13, and numeral 17 is a voltage-controlled current source for generating a current according to an output from the D/A converter 14.

The voltage-controlled current source 16 is used as a drive source of the first laser diode 18, and the voltage-controlled current source 17 as a drive source of the second laser diode 19. Numeral 20 designates the timing signal generator for controlling operation timing of each part. The timing signal generator 20 generates the following signals: enable signals S2, S3, S4, each bringing an associated U/D counter 9, 10, 11 into an enable state for a time sufficient to count one, based on signal S1 indicating that the leading beam is tracing a preformat portion; the power changeover signal S5 for changing connection of the changeover switch 15 depending upon an operation mode; and the signal S6 for controlling on and off of switch 21.

Signal S1 is generated by the signal processing system, based on an output from the photosensors for signal processing. Further, the signal S6 is a signal for controlling on/off of the trailing beam, which is synchronized with signal S2. The changeover switch 21 is a switch for switching a output current from the voltage-controlled current source 17 on or off, based on the control signal S6, and the current is supplied to the second laser diode 19 when this switch 21 is on. Although the present embodiment includes various mechanisms and circuits necessary for recording and reproduction of information in addition to the above arrangement, description thereof is omitted herein because those are well known.

Figure 2A:
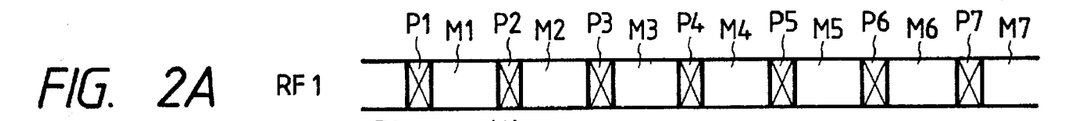
FIGS. 2A–2I are time charts to illustrate the operation of the embodiment of FIG. 1.
Figure 2B:
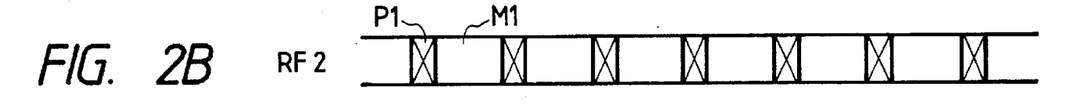
Figure 2C:
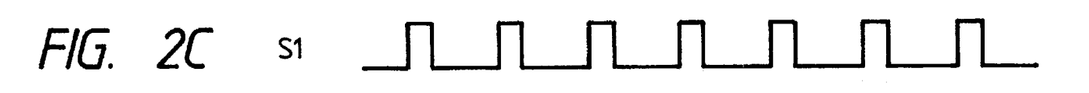
Figure 2D:
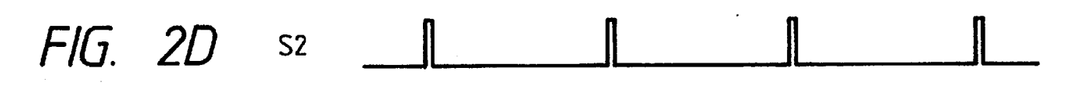
Figure 2E:
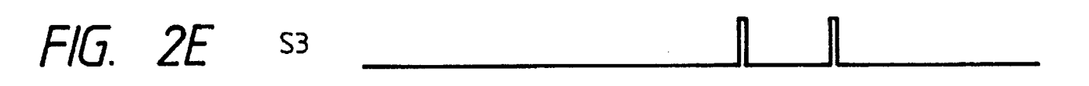
Figure 2F:
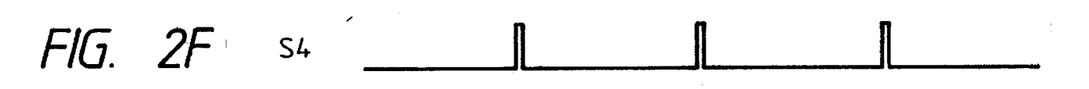

The detailed operation of the present embodiment is next explained referring to FIGS. 2A–2I. RF1 in FIG. 2A indicates timing of a reproduction signal by the leading beam, and RF2 in FIG. 2B timing of a reproduction signal by the trailing beam. Further, P1 to P7 in FIGS. 2A and 2B are preformat portions on the track of magneto-optical disk 1, and M1 to M7 are magneto-optical (data) recording portions. FIGS. 2A and B show a time difference between RF1 and RF2, corresponding to a separation between spots of the leading beam and the trailing beam, and a value of the time difference is sufficiently smaller than a duration of a preformat portion. FIG. 2C shows the signal S1 transmitted from the signal processing system to the timing signal generator 20, which is synchronized with P1 to P7 of RF1 in FIG. 2A. FIGS. 2D and 2F show the enable signals from the timing signal generator 20, and these enable signals S2, S4 are alternately output with respect to the signal S1. A rise of enable signal S1, S2 starts after $V_{mon}$ in FIG. 2I as explained below becomes stable, and a fall thereof starts at the same time as or before a fall of signal S1.

Figure 2G:
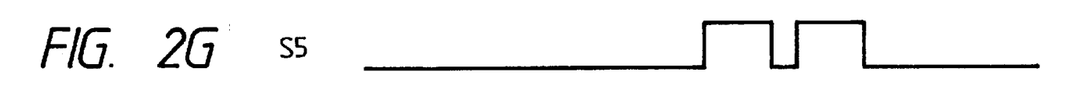
Figure 2H:
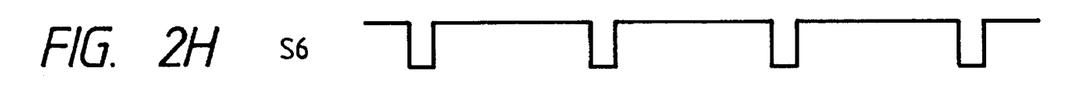
Figure 2I:
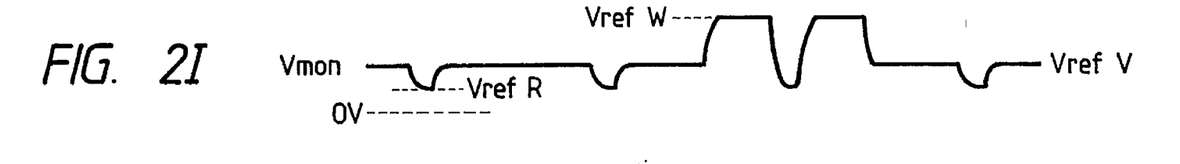

In the present embodiment, let us assume that recording of information (overwrite and direct verification) is made in magneto-optical recording portions M4, M5, and thus, the power changeover signal S5 of FIG. 2G is synchronized with timing of M4, M5. With the timing, the enable signal S3 of FIG. 2E becomes active once in each active duration of the power changeover signal S5. The switch control signal S6 of FIG. 2H is synchronized in rise and fall with the signal S1 and becomes inactive only in preformat portions where the enable signal S2 becomes active. $V_{mon}$ of FIG. 2I shows the output voltage (laser power monitor signal) from the preamplifier 5.

Here, in the section of P1 in RF1 of FIG. 2A, the switch control signal S6 is inactive, so that the changeover switch 21 is off. Thus, the trailing beam is off and only the leading beam is on. Further, since the power changeover signal S5 is inactive as shown in FIG. 2G, the switch 15 selects the D/A converter 12. Accordingly, in this state, the output voltage $V_{mon}$ from the preamplifier 5 is lowered to near $V_{ref}R$ as shown in FIG. 2I, and it shows a slight delay from a restriction of response speed of the laser power monitor system. Before the signal S2 becomes active, $V_{mon}$ is already stabilized. Thus, the U/D counter 9 counts one digit up or down in synchronization with the signal S2.

In this case, because the output from the 10 comparator 6 turns to the high level when $V_{mon}$ is smaller than $V_{ref}R$, the U/D counter 9 counts up to increase the count value of the D/A converter 12. The value of D/A converter 12 is converted into a current according to the value in the voltage-controlled current source 16, and the current is supplied to the first laser diode 18. Since a quantity of light received by the photosensor 4 at this moment is smaller than a predetermined value, the U/D counter 9 counts up, so as to effect such control as to increase the current applied to the first laser diode 18 and to increase the power of the leading beam. On the other hand, when $V_{mon}$ is greater than $V_{ref}R$, the output from the comparator 6 turns to the low level. Thus, the U/D counter 9 counts down, so as to effect such control as to decrease the current to the first laser diode 18 and to lower the power of the leading beam.

Next, in the section of P2 in RF1 of FIG. 2A, the switch control signal S6 is active, so that the changeover switch 21 is on. Thus, both the light beams of the leading and trailing beams are on. Accordingly, in this state, the output voltage $V_{mon}$ from the preamplifier 5 changes to a voltage corresponding to a sum of the powers of the two beams, as shown in FIG. 2I, that is, to a voltage near $V_{ref}V$. Here, the control of the leading beam goes into a rest state, because the signal S2 is not output as shown in FIG. 2D, and thus, only the control of the trailing beam is carried out. As for the control of the trailing beam, control of power is performed by increasing or decreasing the supply current depending upon a result of count up or count down of one digit by the U/D counter 11 in synchronization with the signal S4. Namely, when $V_{mon}$ is smaller than $V_{ref}V$, in accordance with the output signal from the comparator 8, the U/D counter 11 counts up to increase the value of D/A converter 14. As a result, the current amount of the voltage-controlled current source 17 increases, thereby increasing the power of the trailing beam. On the other hand, when $V_{mon}$ is greater than $V_{ref}V$, the U/D counter 11 counts down to effect such control as to decrease the power of the trailing beam.

As described, APC is effected by alternately repeating actuation of only the leading beam and actuation of both the leading beam and trailing beam in the preformat portions so that the power control of the leading beam is performed with actuation of the leading beam and so that the power control of the trailing beam is performed with actuation of both the beams, whereby the leading beam is controlled to the power corresponding to $V_{ref}R$, i.e., the reproducing power, and the trailing beam is controlled to the power corresponding to $V_{ref}V-V_{ref}R$, i.e., the power for direct verification. The reason why the description started explaining that $V_{mon}$ turns to near $V_{ref}R$, $V_{ref}V$ in the sections of preformat portions P1, P2, respectively, is that the above result was presumed.

The control operation upon recording is next explained. In the sections of magneto-optical recording portions M4, M5 the power changeover signal S5 becomes active in order to perform recording, and thus, the switch 15 selects the output of the D/A converter 13 and to supply it to the voltage-controlled current source 16. At this moment, the value of U/D counter 10 takes a value corresponding to a current applied according to the recording power of the leading beam to be changed. Next, in synchronization with signal S3 the U/D counter 10 counts one digit up or down. Also, in this case, when the output signal from the comparator 7 shows that $V_{mon}$ is smaller than $V_{ref}W$, the counter counts up to effect such control as to $V_{ref}W$ increase the power of the leading beam. In contrast, when $V_{mon}$ is greater than $V_{ref}W$, the counter counts down to effect such control as to lower the power of the leading beam. Here, $V_{mon}$ becomes the voltage corresponding to a sum of the powers of the leading beam and the trailing beam, as shown in FIG. 2I, and the power of the trailing beam is already changed to the power for direct verification by APC in the preformat portion. Therefore, the control works to change the leading beam into the power corresponding to $V_{ref}W-(V_{ref}V-V_{ref}R)$, i.e., into the recording power. Accordingly, APC can be effected so as to maintain the leading beam at the predetermined recording power, for example, even in the cases where the recording operation is continued for a long period. The basic operation was explained above, and further detailed description is continued.

First, since the present embodiment employs the sampling APC synchronized with sectors as explained above, the control frequency band is limited by sampling frequency. Further, in the case of digital APC, considering that an amount of conversion of laser power per digit of U/D counter should be set so as to be sufficiently smaller than the reproducing power (for example, 1.5 mW), it must be accepted that the follow-up speed of APC becomes considerably slow. However, results of research by the inventors of the present application gave such a conclusion that as far as the changes of the laser power were limited to those due to temperature changes, 5 ms was enough for the period of sampling APC when 1% of the reproducing power was taken for a change amount of laser power per digit of U/D counter.

This is because the laser diode is actually used as coupled with a metal component with a large heat capacity for the purposes of positioning and radiation of heat. Accordingly, for example, even if a 3.5-inch 1st ISO disk is rotated at a relatively low speed of 1800 rpm, the sector period becomes about 1.3 ms, which is sufficient to carry out the present invention. Further, another factor of power changes other than the temperature changes is variations in reflectivity of disk, which can be effectively overcome by the high-frequency superimposing technique. Such a high-frequency superimposing technique is widely and popularly used in the magneto-optical disk drive apparatus in order to decrease laser noise in signal band, and also has an effect to suppress even changes in the frequency region lower than the signal band and higher than the control band of APC as described above. Accordingly, the present invention is desired to be used in combination with the high-frequency superimposing technique.

Next, the present embodiment includes a possibility of causing the following problem when the procedures of alternately outputting the signals S2 and S4 are simply repeated as shown in FIGS. 2A-2I. Namely, because APC of the trailing beam is performed by the sum of the powers of the leading beam and trailing beam, if the leading beam should have a power away from the predetermined power, APC of the trailing beam could be performed with an erroneous value as a target. For example, supposing the power of the leading beam is decreased to one half for some reason and the decreased power is maintained for a while as not recovered by the APC for the leading beam, the trailing beam is controlled by APC during this period to a value one and a half times greater than the predetermined value. Thus, in the worst case, data recorded could be broken by the trailing beam. A conceivable method to overcome this problem is a method for setting a response speed (control band) of APC of the trailing beam, i.e., APC performed by the sum of the powers of both the beams slower (or lower) than the response speed (control band) of APC of the leading beam, i.e., APC of only the leading beam, but, more directly, it is also desired to use an APC switching means as described next. Namely, it is a method for permitting APC of the trailing beam only when the power of the leading beam comes to exceed a predetermined value by APC of the leading beam and always performing APC of the leading beam every time after APC of the trailing beam is finished once.

Figure 3:
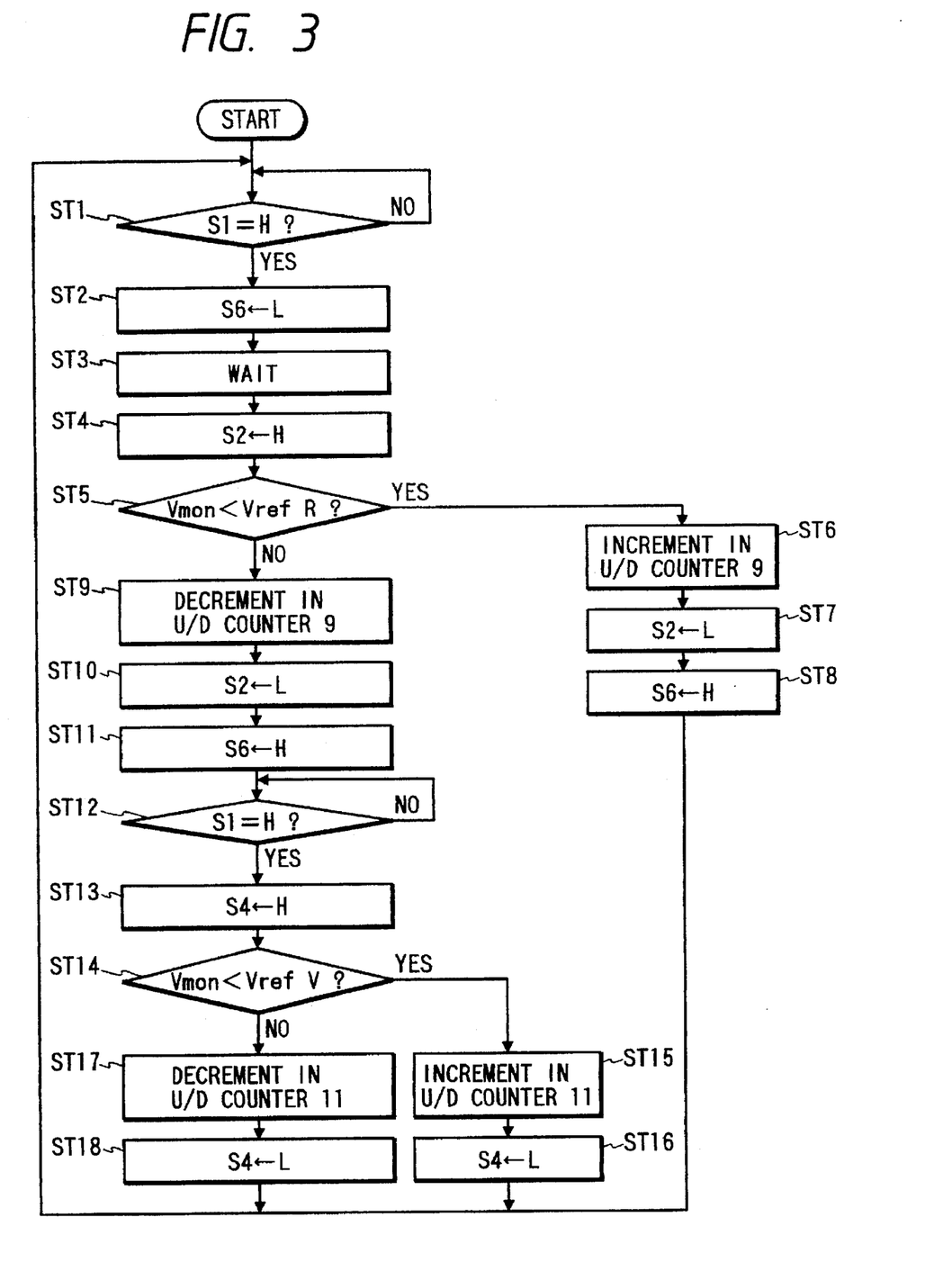
FIG. 3 is a flowchart to show an example of a method for preventing an excessive increase in power of the trailing beam when the leading beam becomes off from a predetermined power.

FIG. 3 is a flowchart to show this algorithm, which is illustrated in correspondence with the operations of the timing signal generator 20, U/D counter 9, and U/D counter 11. In FIG. 3, first, the timing signal generator 20 waits before the signal S1 becomes H (active) (ST1). When the signal S1 turns to H, the signal S6 is changed to L (inactive) (ST2) o turn the trailing beam off. Next, the timing signal generator 20 waits for a delay time of the laser power monitor system (ST3). Namely, it waits before the laser power monitor output of the output voltage from the preamplifier 5 becomes accurately equal to a voltage corresponding to the power (light quantity) of the leading beam. After waiting for a constant time, the timing signal generator 20 changes the signal S2 to H (ST4) to permit the operation of U/D counter 9, and thereafter, the laser power monitor output $V_{mon}$ is compared with the predetermined reference voltage $V_{ref}R$ (ST5).

Here, if the power monitor output $V_{mon}$ is smaller than the reference voltage $V_{ref}R$, an increment is given to the U/D counter 9 (ST6); after completion of the operation of U/D counter 9 the signal S2 is changed to L (ST7) and the signal S6 to H (ST8), thereby turning the trailing beam on. Then, returning to ST1, the same processing is repeated before $V_{mon}$ becomes greater than $V_{ref}R$. Namely, APC is continued only for the leading beam before the light output of the leading beam reaches the predetermined value.

Meanwhile, if at ST5 the power monitor output $V_{mon}$ is greater than the reference voltage $V_{ref}R$, a decrement is given to the U/D counter 9 (ST9), the signal S2 is changed to L (ST10), and the signal S6 is changed to H (ST11), thus turning the trailing beam on. Then, the generator 20 waits before the signal S1 turns to H (ST12). When the signal S1 turns to H, the signal S4 is changed to H (ST13) to permit the operation of the U/D counter 11. At this moment, the power monitor output $V_{mon}$ is a voltage corresponding to a light quantity of the sum of the leading beam and trailing beam, and this power monitor output $V_{mon}$ is compared with the predetermined reference voltage $V_{ref}V$ (ST14).

On this occasion, if the laser power monitor output $V_{mon}$ is smaller than $V_{ref}V$, an increment is given to the U/D counter 11 (ST15), the signal S4 is changed to L (ST16), and then the flow returns to ST1. On the other hand, if the laser power monitor output $V_{mon}$ is greater than $V_{ref}V$, a decrement is given to the U/D counter 11 (ST17), the signal S4 is changed to L (ST18), and then the flow returns to ST1, then repeating the same processing. Namely, since the leading beam is already controlled by APC at the predetermined light quantity in this case, an error between the laser power monitor output $V_{mon}$ and the reference voltage $V_{ref}V$ can be said to be an error of the light quantity of the trailing beam relative to the predetermined light quantity. Accordingly, the current to the laser diode for the trailing beam can be increased or decreased by giving an increment or a decrement to the U/D counter 11 depending upon a direction of the error, so that APC of the trailing beam can be performed to the predetermined light quantity by repeating this operation. As described, APC of the trailing beam is performed when the laser power monitor output $V_{mon}$ comes to exceed the predetermined value, and APC of the leading beam is performed after execution of APC of the trailing beam, whereby an excessive increase of the power of the trailing beam can be prevented, which can prevent recorded data from being damaged.

Another switching method of APC is one for simply inhibiting an output of signal S4, for example, based on a comparison result of the comparator 6. The method as described above is one for preventing the trailing beam from having over power due to a malfunction of APC with a power drop of the leading beam, but a possible arrangement may be such that a comparator is added to permit APC of the trailing beam only when the leading beam is within a predetermined range.

APC of the recording power is next explained. Since the trailing beam is also on in performing APC of the leading beam to the recording power, the APC is based on the sum of the powers of the two beams. Accordingly, a malfunction possibly occurs of the APC due to a power error of the trailing beam as described above. This problem can be overcome by applying the APC switching means as described above, but influence of the malfunction is limited because the recording power is considerably higher than the verifying power. For example, supposing the recording power is 10 mW and the verifying power varies in the range of 1.5 mW±0.5 mW, the recording power can be kept in changes in the range of 9.5 mW to 10.5 mW even with the malfunction of APC.

Further, the magneto-optical recording portions (M1 to M7) generally have lengths ten times longer than the preformat portions (P1 to P7). Therefore, as long as the response speed (transmission band) of the laser power monitor system is set so as to permit sufficient sampling in the preformat portions, up or down operation of the counter can be performed twice or more within one sector in the magneto-optical recording portions even considering a difference of power change amount. Accordingly, the timing signal generator 20 may be constructed so as to make the signal S3 in FIGS. 2A–2I active twice or more at equal intervals in M4, M5. However, considering the feature of the present invention, which is to permit use of a relatively low-speed laser power monitor system, it is impossible to obtain the predetermined recording power by APC from the beginning of recording for an arbitrary initial value of U/D counter 10 even with a maximum number of the up or down times of counter within a sector. In a desired arrangement, the apparatus is thus arranged to output the predetermined recording power by a trial lighting technique, i.e., by trial lighting prior to the recording operation, to obtain a counter value of U/D counter 10 corresponding thereto, and to set this value in the U/D counter 10 prior to the recording operation.

Figure 4A:
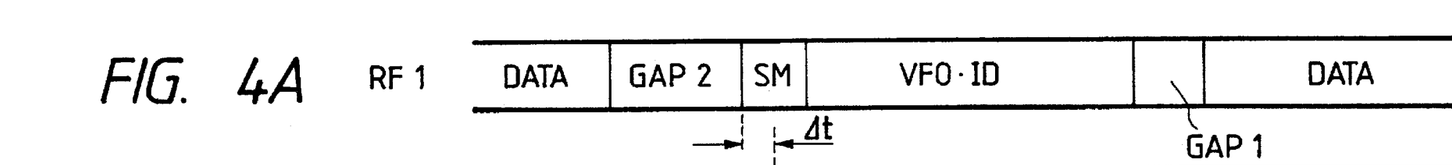
FIGS. 4A–4E are enlarged drawings of the vicinity of preformat portion P1 in the time charts of FIGS. 2A–2I.
Figure 4B:
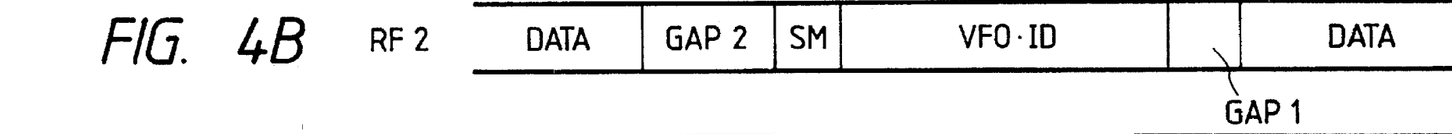

Next explained is the timing of each signal near P1 in FIGS. 2A–2I. FIGS. 4A–4E are drawings to show the region near P1 in FIGS. 2A–2I on an enlarged time axis. In FIG. 4A or 4B, SM represents a sector mark indicating a position of a the head of sector. SM and VFO•ID indicate preformat portions while DATA indicates the magneto-optical recording portions, in which data is to be recorded. A gap portion (GAP) for absorbing a rotational change or the like of the magneto-optical disk 1 is provided between a preformat portion and a data portion. Between RF1 and RF2 there is the time difference of Δt corresponding to the distance between the beam spots, as described previously. Here, a period to keep the trailing beam off, which is a period in which the switch control signal S6 is inactive, is basically a duration corresponding to AND between preformat portions in RF1 and RF2.

This is because of the following reasons. First, a rise of the switch control signal S6 is synchronized with the head of SM in RF2, which is based on the fact that the trailing beam cannot be turned off because there is a possibility that data is being reproduced (or verified) immediately before SM, including GAP2, based on the output of RF2. Further, a rise of the switch control signal S6 is synchronized with the tail of VFO•ID in RF1, which is based on the fact that at latest the laser power monitor signal must be evaluated up to this point because there is a possibility that the leading beam is switched to the recording power immediately after reproduction of the preformat signal, and the fact that it is sufficient to turn the trailing beam off before this point.

Figure 4C:
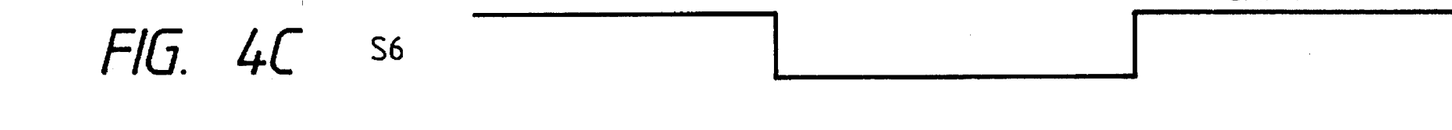
Figure 4D:
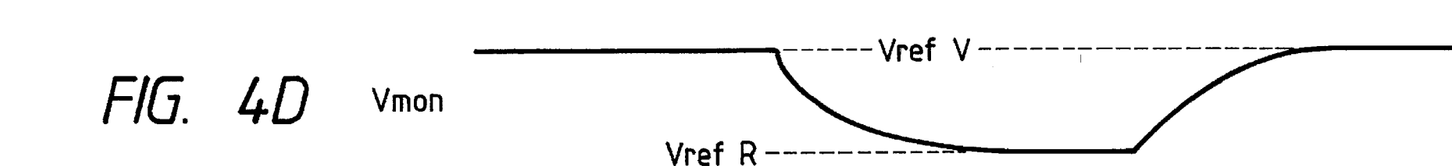
Figure 4E:
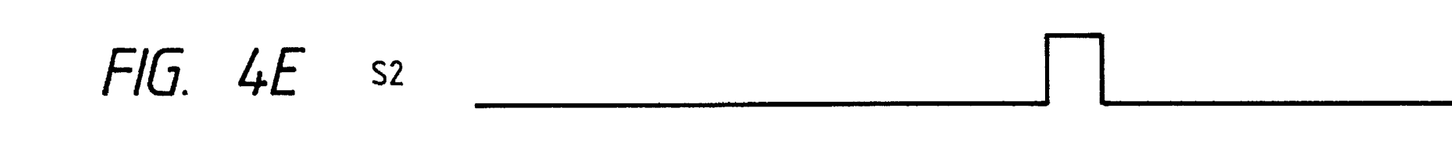

Here, an increase in Δt will decrease a permissible value of a delay in response time of the laser power monitor system, which damages the feature of the present invention, which is to permit use of a relatively low-speed system. Thus, the distance between the spots of the leading beam and trailing beam must be precisely determined. For the same reason, a period to keep the signal S2 active, more precisely a time for evaluating the laser power monitor signal $V_{mon}$, is most preferably a time immediately before a rise of switch control signal S6, as shown in FIGS. 4C and 4E. Incidentally, observing the vicinity of P2 in FIGS. 2A–2I, the switch control signal S6 is kept active and there is no basic change in $V_{mon}$. Accordingly, it can be considered that the timing for making the signal S4 active may be arbitrarily determined within the preformat period in RF1, but because, according to the results of research by the inventors of the present application, $V_{mon}$ shows a slight change between the initial stage and the final stage of the preformat period because of a difference in average reflectivity between the preformat portions and the magneto-optical recording portions, preferred timing to make the signal S4 active should be determined so as to always have at least a predetermined phase relative to the preformat period, preferably the same phase as the signal S2.

As described above, the present embodiment is arranged so that, noting such a point that the laser beam for direct verification can be turned off for a relatively long time during reproduction of the preformat portion by the leading beam, the one laser diode is turned off for alternate preformat portions and the light outputs from both the laser diodes are controlled when the one laser diode is turned off and when both laser diodes are turned on, whereby the light outputs from the two laser diodes can be effectively controlled to the desired values even in the structure to detect the light outputs from the two laser diodes by one photosensor. Since the present embodiment is free of such a restriction that the laser power monitor signals must be obtained within a short time in test sections provided in the preformat portions or the gap portions provided before and after the data regions, the laser power monitor system does not have to be constructed in the high-speed arrangement, and thus, a low-speed laser power monitor system can be sufficient to operate.

Figure 5:
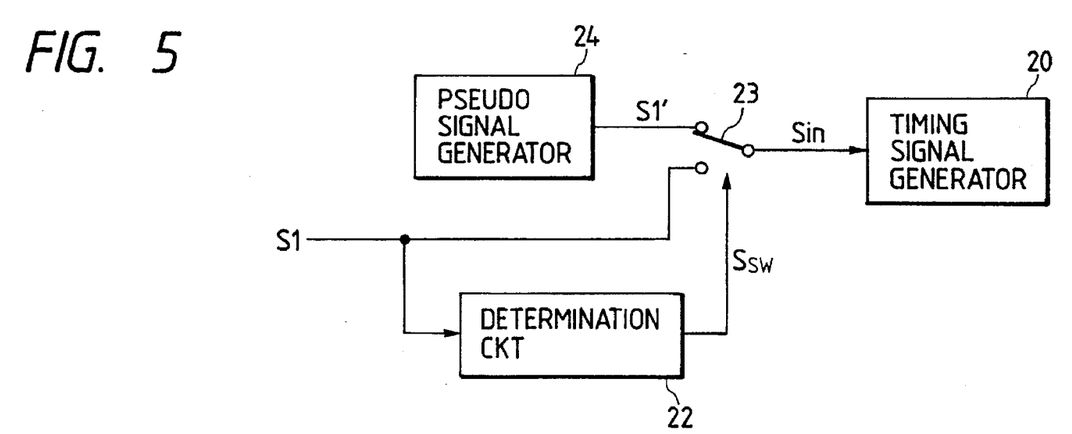
FIG. 5 is a block diagram to show the second embodiment of the present invention.

The second embodiment of the present invention is next explained. The embodiment of FIG. 1 is constructed so as to input the signal S1 synchronized with the preformat portions into the timing signal generator 20, whereas the present embodiment is such an example, that, for example during a duration in which the preformat signal cannot be reproduced before a start of the servo operation to make the laser beam focused on the disk and tracing a track, or during a period where reproduction of the preformat signal is not necessary, a pseudo signal S1' similar to the signal of S1 upon reproduction of the preformat signal is input as an input to the timing signal generator 20 of FIG. 1 instead of the signal S1. FIG. 5 is a structural drawing to show a specific form of this example.

Figure 6A:
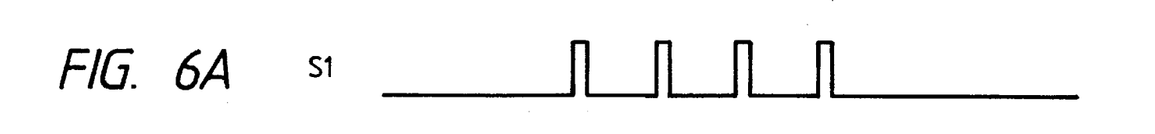
FIGS. 6A–6D are time charts to illustrate the operation of the embodiment of FIG. 5.
Figure 6B:
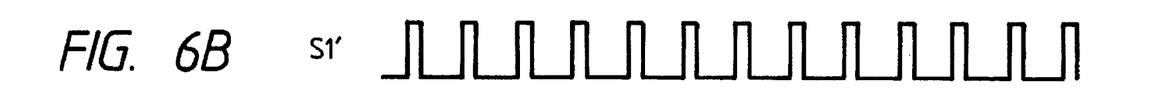
Figure 6C:
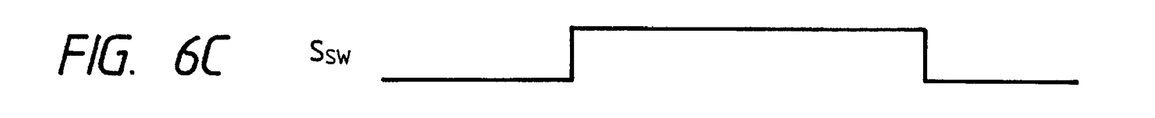
Figure 6D:
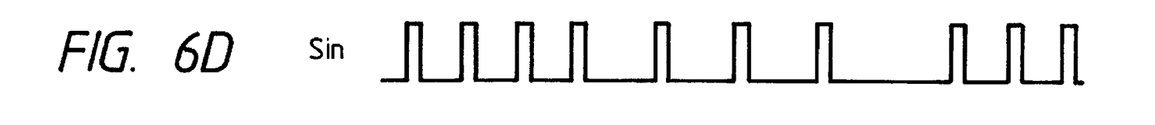

In FIG. 5, reference numeral 24 designates a pseudo signal generator for generating the pseudo signal S1', and 23 a changeover switch for selecting either one of the pseudo signal S1' and the signal S1 synchronized with the preformat portions depending upon an output from a determination circuit 22. The determination circuit 22 monitors the signal S1 and switches the changeover switch 23 so as to select he pseudo signal S1' when the signal S1 is not input over a fixed time. The pseudo signal S1' is constantly activated at a predetermined period, as shown in FIG. 6B. With an absence of input of signal S1 over the fixed time, as shown in FIG. 6A, the determination circuit 22 turns a signal $S_{sw}$ for transmitting a determination result active, as shown in FIG. 6C, to switch the changeover switch 23 to the side of pseudo signal S1'. This causes the pseudo signal S1' to be input instead of the signal S1 as an input signal $S_{in}$ into the timing signal generator 20, as shown in FIG. 6D, and the timing signal generator 20 generates each timing signal, based on the signal S1'. This arrangement permits the same control of light outputs from the first and second laser diodes 18, 19 as in the previous embodiment, even in the cases where the signal synchronized with the preformat portions is not obtained, simply by switching the input signal to the timing signal generator 20 without changing the basic APC.

The third embodiment of the present invention is next explained. The embodiment of FIG. 1 was explained as an example in which the leading beam is used for recording of data, reproduction of preformat portions, and the servo operation while the trailing beam for data reproduction upon direct verification and in which either light beam of the leading and trailing beams is used for normal reproduction of data, whereas the present embodiment is an example in which, instead of the leading beam, the trailing beam is used for reproduction of preformat portions. In this case, the leading beam, which is not used for reproduction of preformat portions, is naturally turned off in the preformat portions. Accordingly, the changeover switch 21 for turning the trailing beam in the embodiment of FIG. 1 on or off is connected as a rear stage of the voltage-controlled current source 16 and the reference voltages of the comparators 6 and 8 are also changed to $V_{ref}V$ for the comparator 6 and $V_{ref}R$ for comparator 8. Further, the signals S2 and S4 are naturally replaced with each other.

Figure 7:
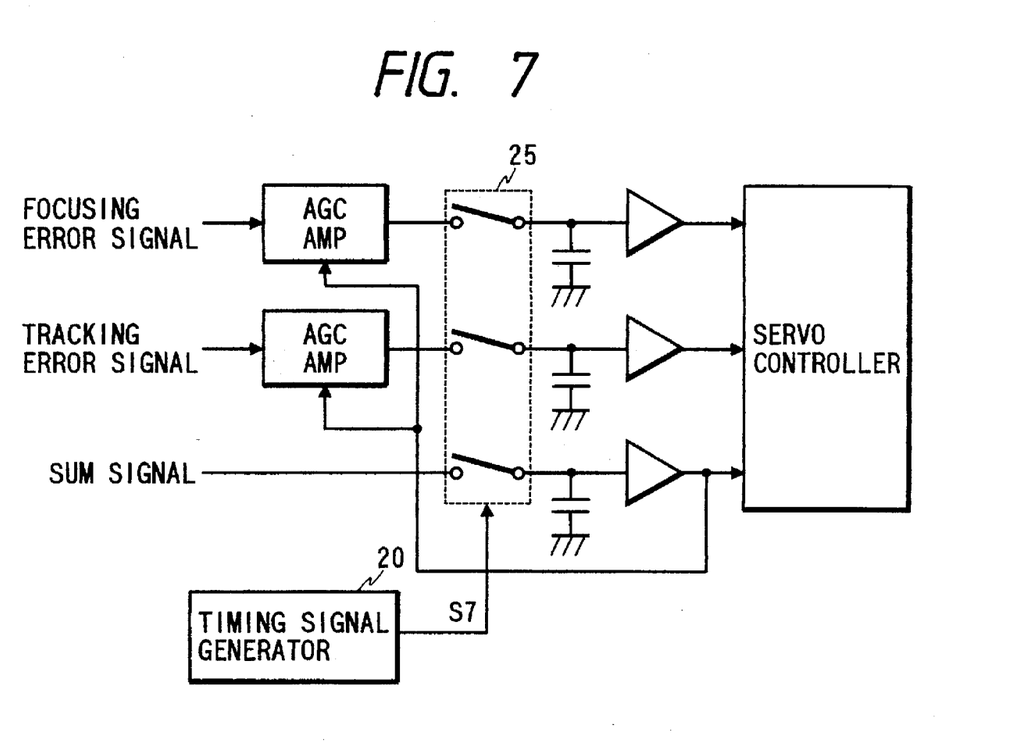
FIG. 7 is a block diagram to show a hold circuit of a servo error signal in the third embodiment of the present invention.

Here, in the case of the above arrangement being employed, it is necessary to take it into consideration that the servo operation is affected when the leading beam is turned off in the preformat portions, because the leading beam is also used for focusing servo and tracking servo. With regard to this point, durations of the preformat portions (20 to 50 μs) are considerably short as compared with the control band of the servo operation, the influence can be minimized by restricting the control band as long as care is taken to avoid occurrence of nonlinear behavior such as saturation of the servo error detection system when the leading beam is turned off. More positively, by employing the arrangement as shown in FIG. 7, a desired example is arranged to hold the servo system at least during the off period of the leading beam. The arrangement of FIG. 7 is next explained.

In FIG. 7, signal S7 is a signal to become inactive at least during an inactive period of the signal S6, and the timing signal generator 20 is arranged to output this signal S7 to a changeover switch 25. Accordingly, servo error signals (focusing error signal and tracking error signal) are held by the changeover switch 25 when the signal S7 is inactive, and thus, the servo error signals can be held at least during the off period of the leading beam. It is a matter of course that there are a variety of techniques for holding the servo system in addition to the above. Recent progress in the digital servo technology permits highly intelligent control to be achieved, so that in cases where the beam used for the servo operation is turned off for a short time, the influence thereof can be almost nullified by informing the servo control system of the timing. It is also theoretically possible to use the trailing beam for the servo operation, but it is not preferred because the leading beam used for recording cannot be directly position-controlled thereby. Namely, because higher-accuracy position control is required for the recording beam than for the reproducing beam from the reason of compatibility etc., the servo control by the trailing beam is not preferred, but the servo control with the leading beam is desired.

Figure 8:
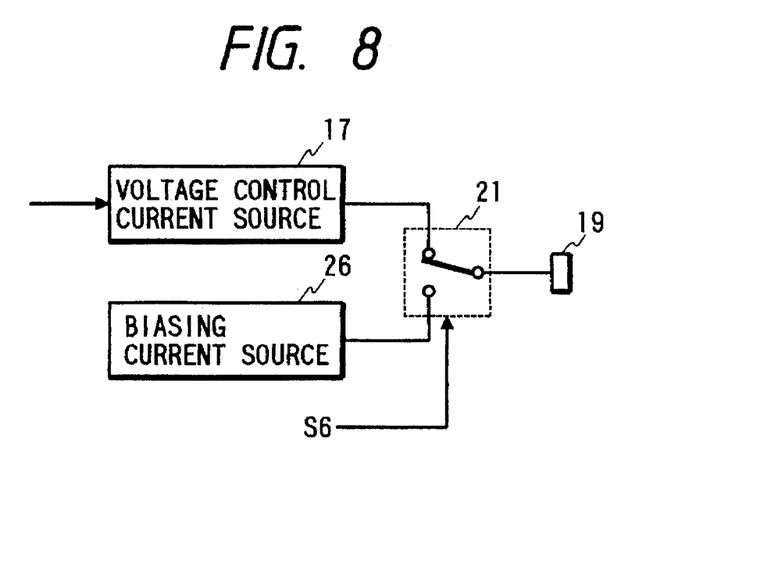
FIG. 8 is a block diagram to show the fourth embodiment of the present invention.

The fourth embodiment of the present invention is next explained. The embodiment of FIG. 1 is arranged so that for turning the trailing beam off, the switch 21 is turned off to bring the supply current to the second laser diode 19 into 0, but the current may be continuously applied to such an extent that the second laser diode 19 is kept so as not to emit a laser beam. FIG. 8 shows a specific example of a current supply circuit for this arrangement, in which the switch 21 is arranged to select either one of the voltage-controlled current source 17 and a bias current source 26. The switch is arranged to select the voltage-controlled current source 17 when the signal S6 is active, and to select the bias current source 26 when the signal S6 is inactive. This arrangement permits a bias current to be supplied to the second laser diode 19 during an off period of the trailing beam.

This bias current, in the case of the high-frequency superimposing technique also being used, is smaller than a value obtained by subtracting a high-frequency effective current from a threshold current of the laser diode 19. This arrangement changes nothing in the basic operation of the present invention, but can achieve the following effects. First, a temperature change of the second laser diode 19 can be kept small when the trailing beam is turned on or off, thereby improving the stability of APC. Second, an impedance change of the laser diode can be kept small similarly when the second laser diode 19 is turned on or off, thereby improving the stability of the high-frequency superimposing operation in the case of the high-frequency superimposing technique also being used.

Results of research by the inventors of the present application confirmed that in such an arrangement that coupling between a high-frequency oscillating circuit and the second laser diode 19 was made tight by using a resonance type matching circuit to apply a sufficient high-frequency current, when the bias current was set at about 5 mA during the off period of the second laser diode 19, the stability was enhanced particularly during the on or off operation of the high-frequency oscillating circuit and good results were achieved. This is considered to be nothing but a result that the impedance change of the laser diode, including junction capacitance and nonlinear behavior, was suppressed to a low level by keeping even a small amount of bias current flowing.

The fifth embodiment of the present invention is next explained. First, considering absolute accuracy of the powers of the leading beam and trailing beam, a control without necessitating the absolute accuracy can be realized for the recording power, because an optimum power can be found out by test writing. In contrast with it, because the reproducing power is determined depending upon several factors including S/N of the reproduction signal and reproduction durability of the disk, adaptive control is difficult, and thus, a generally employed technique is one to accurately control the power into a certain predetermined value. Accordingly, it is necessary to adjust the reference voltages $V_{ref}R$, $V_{ref}V$ of the comparators as explained in FIG. 1 with high accuracy. Further, considering that the reproducing power and direct-verifying power are equally set, then $V_{ref}V=2V_{ref}R$, and thus, the control may be finished only by adjustment for one of them. However, in this case, it is necessary that linearity of the laser power monitor system consisting of the photosensor 4 and preamplifier 5 be assured.

Namely, in order to assure the absolute accuracy of light outputs of the two light beams, the two accurate reference voltages of $V_{ref}R$ and $V_{ref}V$ as explained above are needed and the characteristic of the laser power monitor system needs to be linear, whereby, with $V_{ref}V=2V_{ref}R$, setting only the reference voltage $V_{ref}R$ can be enough. However, in cases where the linearity of the laser power monitor system is not assured (including cases with occurrence of offset), the two reference voltages need to be adjusted independently. However, also employing a calibration function as described below, only one reference voltage of $V_{ref}R$ will be sufficient for the control.

A basic idea is as follows. First, APC is carried out with a reference of $V_{ref}R$ while only the leading beam is on. A laser current of the laser diode for the leading beam at that time is stored. Next, APC is carried out with a reference of $V_{ref}R$ while only the trailing beam is on. A laser current of the laser diode for the trailing beam at that time is similarly stored. After that, when the leading beam and trailing beam are simultaneously turned on by the laser currents stored, the leading beam and trailing beam both become on with a desired light output corresponding to $V_{ref}R$. Thus, the laser power monitor voltage obtained by the preamplifier 5 becomes a voltage corresponding to a light output of a sum of the leading beam and the trailing beam. Namely, the voltage at this moment is just the reference voltage $V_{ref}V$ desired. Storing this voltage, it can be thus used as a reference voltage of the two laser diodes. Of course, because the relation between laser current and light quantity changes momentarily because of influence of the ambient temperature etc., it is necessary to quickly perform the calibration operation to obtain $V_{ref}V$ from the reference voltage $V_{ref}R$ as described above.

Figure 9:
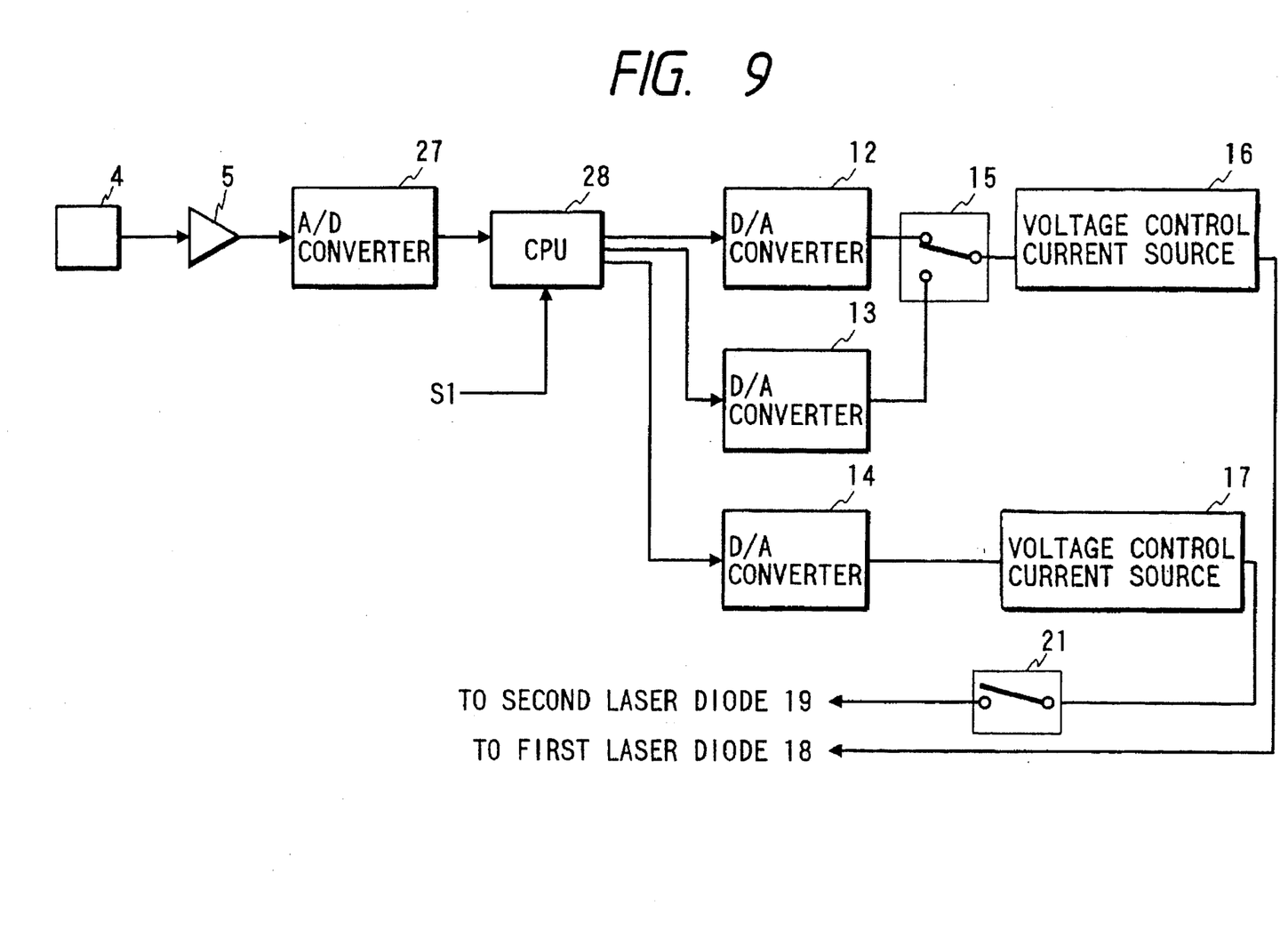
FIG. 9 is a block diagram to show the fifth embodiment of the present invention.

Now, an embodiment with such a calibration function is next explained in detail. FIG. 9 is a block diagram to show the construction of the present embodiment, and FIG. 10 a flowchart to show the operation thereof. First, in FIG. 9, reference numeral 28 denotes a CPU for performing the calibration operation and control of light outputs from the two laser diodes 18, 19. Since the control becomes complicated with addition of the calibration function, preferred control is one by digital signal processing using CPU. The CPU 28 has the functions of the comparators 6 to 8 for comparing the laser power monitor voltage with the respective reference voltages, the functions of the U/D counters 9 to 11 for performing up or down counting, and the function of the timing signal generator 20. Further, the photosensor 4 and preamplifier 5 are the same as those in FIG. 1, and the laser power monitor voltage of the preamplifier 5 is taken into CPU 28 through an A/D converter 27. The D/A converters 12 to 14, changeover switches 15, 21, and voltage-controlled current sources 16, 17 are the same as those in FIG. 1. Further, although not shown, the laser diodes 18, 19 and optical system 3 are also the same in structure as those in FIG. 1.

Figure 10:
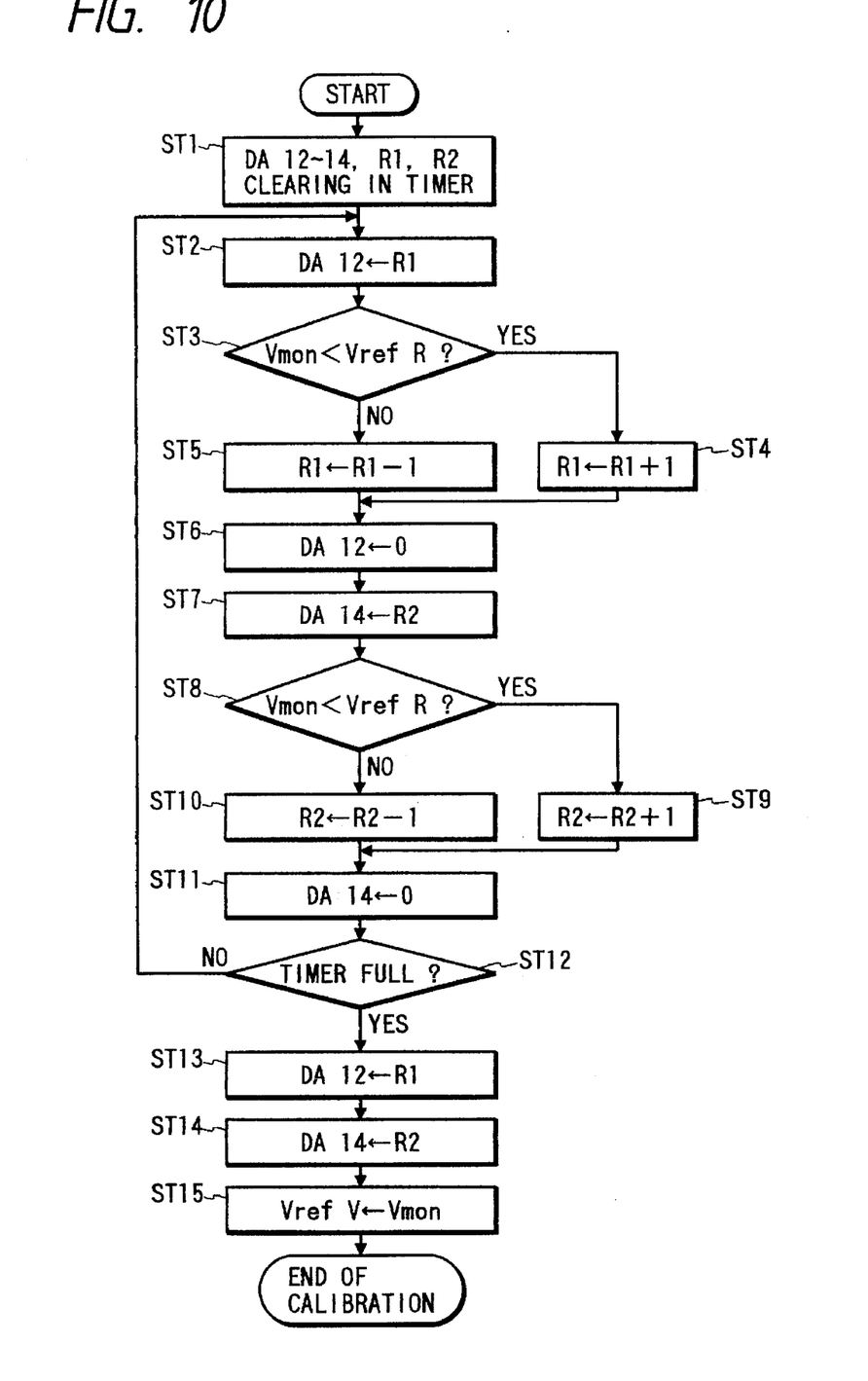
FIG. 10 is a flowchart to illustrate the operation of the embodiment of FIG. 9.

The calibration operation of the above embodiment is next explained referring to FIG. 10. The calibration operation is carried out, for example, upon a start of the apparatus or upon insertion of a disk, before entering the servo operation. In FIG. 10, with the start of calibration, the CPU 28 first clears registers DA12 to 14, registers R1, R2, and timer (ST1). The registers DA12 to 14 are those provided in CPU 28, and register values in DA12 to 14 are output to the D/A converters 12 to 14. DA12 is associated with the D/A converter 12, DA13 with the D/A converter 13, and DA14 with the D/A converter 14. The registers R1, R2 are also registers for retaining data, provided similarly in CPU 28, and the timer is also provided in CPU 28.

Clearing each part, CPU 28 sets the value of register R1 into DA12 (ST2), and outputs the value to the D/A converter 12. On this occasion, the value of register R1 is 0. In this state, the CPU 28 compares the laser power monitor voltage $V_{mon}$ taken through the A/D converter 27 with the reference voltage $V_{ref}R$ (ST3). If $V_{mon}$ is smaller than $V_{ref}R$, the value of register R1 is increased by one digit (ST4); if larger, the value of register R1 is decreased by one digit (ST5). Then, the CPU 28 clears DA12 (ST6) and stores the last value of laser current in the register R1. Next, the CPU 28 sets the value of register R2 in DA14 (ST7). On this occasion, the value of register R2 is 0. In this state, the CPU compares the laser power monitor voltage $V_{mon}$ with the reference voltage $V_{ref}R$ (ST8). If $V_{mon}$ is smaller than $V_{ref}R$, the value of register R2 is increased by one digit (ST9); if larger then the value of register R2 is decreased by one digit (ST10). After that, the CPU clears DA12 (ST11). The last laser current is stored in the register R2.

The CPU 28 determines whether the timer is up or not (ST12). If the timer is not up, the CPU returns to ST2. In this case, because of the second cycle, the value 1 of R1 is set in DA12 (ST2), and the first laser diode 18 is turned on. Next, the same processing is carried out at ST3 to ST5, and then DA12 is cleared at ST5 to turn the first laser diode 18 off. Further, the value 1 of register R2 is set in DA14 at ST7 to turn the second laser diode 19 on, and the same processing is carried out at ST8 to 10. Then, DA14 is cleared at ST11 to turn the second laser diode off. In this manner, the CPU 28 repeats the processing of ST2 to ST11 before the first and second laser diodes 18, 19 become stabilized.

Here, the time in the timer is set to a time in which the two laser diodes 18, 19 can come to a stable on state. Repeating the processing of ST1 to ST12, the first and second laser diodes 18, 19 each will be finally controlled to the light output corresponding to the reference voltage of $V_{ref}R$.

Accordingly, after the timer is up in CPU 28 to stabilize the two laser diodes 18, 19, the latest value of register R1 is set in DA12 (ST13) and the latest value of register R2 is set in DA14 (ST14), thereby turning the first and second laser diodes 18, 19 on. On this occasion, the two laser diodes 18, 19 emit the light outputs corresponding to the reference voltage $V_{ref}R$, and then the CPU 28 captures the laser power monitor voltage $V_{mon}$ at this moment through the A/D converter 27 and stores it in an internal memory (ST15). A voltage value obtained is stored as a digital value in a register other than R1, R2, and the value is read out of the register to be used as a reference voltage $V_{ref}V$ upon subsequent APC operation. The above completes the calibration operation, and then processing proceeds to the APC operation as explained with FIG. 1.

For carrying out the APC operation by the arrangement of FIG. 9, the CPU 28 is used to execute the processing of the flowchart as explained with reference to FIG. 3. Namely, program control of CPU 28 executes the comparison operation of the comparators 6 to 8, the up-down count operation of the U/D counters 9 to 11, etc., whereby exactly the same control can be performed as the APC operation of the first and second laser diodes 18, 19 as explained referring to FIG. 1 and FIGS. 2A–2I.

As described above, the use of the calibration operation can obviate a need to perform adjustment of $V_{ref}V$ and a need to assure linearity of the laser power monitor system. Accordingly, only one necessary is the absolute accuracy of the reference voltage $V_{ref}R$ for the reproducing power. Thus, with only accurate adjustment thereof, the reference voltage $V_{ref}V$ will be able to be automatically obtained for the reproducing power and the direct verifying power.

The embodiment of FIG. 1 is arranged so that the current applied to the first laser diode 18 upon the recording operation can be obtained by switching the switch 15 to the output side of the D/A converter 13, but another arrangement may be constructed in such a manner that a voltage-controlled current source is provided after the D/A converter 13 and a current output therefrom is added through a current switch to the output of the voltage-controlled current source 16. In this case, the signal S5 is arranged to control the current switch, and upon recording, the current switch is turned on to control the supply current for recording to the first laser diode 18 at the recording power. The other control signals are the same as before. Further, the APC operation as explained referring to FIG. 1 and FIGS. 2A–2I is carried out for every sector, but the operation may be thinned out within the scope to satisfy necessary APC speed. For example, the operation may be arranged to perform one control for two sectors. Of course, in that case, each signal of S2 to S6 is arranged to be synchronized with signal S1.

Although the above description concerned the examples of digital APC, the present invention can be carried out even in analog APC. In this case, though detailed explanation is omitted, for example, the comparator 6 in the embodiment of FIG. 1 is replaced by a differential amplifier, the U/D counter 9 by a hold circuit, and the D/A converter by a filter amplifier, thereby constructing a system Of analog and digital mixed. In this arrangement, the hold circuit takes an output from the differential amplifier in during a period in which the signal S2 is active, and the filter amplifier is set so that a loop gain may become less than 1 at a frequency being a half of a sampling frequency corresponding to the period of signal S2. Further, the embodiments showed the examples of a magneto-optical disk apparatus, but the present invention is not limited to the examples, and can be applied to any apparatus for performing direct verification using two light sources.

AS explained above, the present invention involves the control of light outputs from the two light sources in the two states where one of the leading beam and trailing beam is on and where both the beams are on, which is free of the restriction of power detection within a short time that the timing for obtaining a power monitor signal is limited to within a test section provided in a preformat portion or within a gap portion between data regions. Therefore, the present invention has an advantage that the light outputs of both the beams can be controlled without a need to employ a high-speed arrangement of the power monitor system and by using a common photosensor.

What is claimed is:

1. An optical information recording and/or reproducing apparatus, which is arranged to radiate a leading light beam from a first light source and a trailing light beam from a second light source to follow the leading beam onto an information track in a recording medium and to perform recording of information with said leading beam and verification with the trailing beam, comprising:

a common photosensor for detecting parts of light quantities of the light beams from said first and second light sources;

means for intermittently turning off the light beam not used for reproduction of preformat portions out of said leading beam and trailing beam, with respect to said preformat portions; and light output controlling means for controlling the leading beam from said first light source and the trailing beam from the second light source at respective predetermined light outputs, based on quantities of light received by said photosensor and reference values preliminarily set, when one of said leading beam and trailing beam is off and when the both of said leading beam and trailing beam are on.

2. The apparatus according to claim 1, wherein when the light beam not used for reproduction of the preformat portions out of said leading beam and trailing beam is off, said light output controlling means controls the light beam being on and used for reproduction of said preformat portions at a light output for reproduction of the preformat portions, based on the quantity of light received by said photosensor and a first reference value preliminarily set.

3. The apparatus according to claim 1, wherein when both of said leading beam and trailing beam are on, said light output controlling means controls said trailing beam at a light output for verification, based on the quantity of light received by said photosensor and a second reference value preliminarily set.

4. The apparatus according to claim 1, wherein when both of said leading beam and trailing beam are on, said light output controlling means controls said leading beam at a light output for recording, based on the quantity of light received by said photosensor and a third reference value preliminarily set.

5. The apparatus according to claim 1, wherein a distance between the leading beam and the trailing beam on said recording medium is set to be shorter than a length of a preformat portion located at the head of each sector in said recording medium.

6. The apparatus according to claim 1, wherein said first and second light sources are comprised of first and second laser diodes formed on a same semiconductor substrate.

7. The apparatus according to claim 1, wherein in a case where the preformat portions are reproduced by the trailing beam out of said leading beam and trailing beam, a servo error signal supplied to a servo control portion is held at one obtained before said leading beam is turned off, during a period when the leading beam is off in said preformat portions.

8. The apparatus according to claim 1, wherein in a state where said first and second light sources do not emit light, a predetermined bias current is supplied to each of said light sources.

9. The apparatus according to claim 1, wherein a quantity of light is monitored of the light beam for reproducing said preformat portions and wherein only when said quantity of light of said light beam is not less than a predetermined value, control of the other light beam is permitted.

10. The apparatus according to claim 1, further comprising:

calibration means for separately turning said leading beam and trailing beam on, prior to a light output control operation, at a reference value corresponding to a light output for reproduction of the preformat portions, simultaneously supplying drive signals corresponding to quantities of received light separately obtained by said photosensor at that time, to said first and second light sources, and letting memory means store a reference value corresponding to a sum of the light output for reproduction of the preformat portions and a light output for verification from signals of light received by said photosensor, obtained at that time.

11. An optical information recording and/or reproducing method, which is arranged to radiate a leading light beam from a first light source and a trailing light beam from a second light source to follow said leading beam onto an information track in a recording medium and to perform recording of information with said leading beam and verification with the trailing beam, comprising:

a step of detecting, in common, parts of light quantities of the light beams from said first and second light sources;

a step of intermittently turning off the light beam not used for reproduction of preformat portions out of said leading beam and trailing beam, with respect to said preformat portions; and a step of controlling the leading beam from said first light source and the trailing beam from said second light source at respective predetermined light outputs, based on said light quantities detected and reference values preliminarily set, when one of said leading beam and trailing beam is off and when both of said leading beam and trailing beam are on.

\* \* \* \* \*

UNITED STATES PATENT AND TRADEMARK OFFICE
CERTIFICATE OF CORRECTION

PATENT NO. : 5,627,813      Page 1 of 2
DATED : May 6, 1997
INVENTOR(S) : Akira MIYASHITA It is certified that error appears in the above-indentified patent and that said Letters Patent is hereby corrected as shown below:

COLUMN 3:

Line 53, "drive o a" should read --drive of a--.

COLUMN 4:

Line 10, "performing$_9$" should read --performing--.

COLUMN 5:

Line 1, "Of" should read --of--; and
   Line 39, "a" should read --an--.

COLUMN 6:

Line 25, "10" should be deleted.

COLUMN 9:

Line 64, "of" should read --of the--.

COLUMN 10:

Line 8, "a" should be deleted and "of" should read --of the--; and
   Line 13, "At" should read --$\Delta t$--.

UNITED STATES PATENT AND TRADEMARK OFFICE
CERTIFICATE OF CORRECTION

PATENT NO. : 5,627,813
DATED : May 6, 1997
INVENTOR(S) : Akira MIYASHITA

It is certified that error appears in the above-indentified patent and that said Letters Patent is hereby corrected as shown below:

COLUMN 11:

Line 28, "he" should read --the--.

COLUMN 14:

Line 22, "upon" should read --upon the--.

COLUMN 15:

Line 57, "Of" should read --of--; and
Line 59, "in" (first occurrence) should be deleted.

COLUMN 16:

Line 1, "AS" should read --As--; and
Line 34, "the" should be deleted.

Signed and Sealed this

Sixteenth Day of December, 1997

Attest:

BRUCE LEHMAN

*Attesting Officer*  *Commissioner of Patents and Trademarks*